(12) United States Patent
So et al.

(10) Patent No.: US 10,106,112 B2
(45) Date of Patent: Oct. 23, 2018

(54) BUMPER SYSTEM FOR VEHICLE

(71) Applicant: LOTTE CHEMICAL CORPORATION, Seoul (KR)

(72) Inventors: Choul Won So, Daejeon (KR); Myung Ho Lee, Gyeongsangbuk-do (KR); Jun Youp Kim, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 15/531,217

(22) PCT Filed: Oct. 15, 2015

(86) PCT No.: PCT/KR2015/010917
§ 371 (c)(1),
(2) Date: May 26, 2017

(87) PCT Pub. No.: WO2016/085119
PCT Pub. Date: Jun. 2, 2016

(65) Prior Publication Data
US 2017/0327065 A1    Nov. 16, 2017

(30) Foreign Application Priority Data

Nov. 26, 2014  (KR) .................. 10-2014-0166094

(51) Int. Cl.
*B60R 19/24*    (2006.01)
*B60R 19/26*    (2006.01)
(Continued)

(52) U.S. Cl.
CPC .............. *B60R 19/18* (2013.01); *B60R 19/04* (2013.01); *B60R 19/24* (2013.01); *B60R 19/26* (2013.01);
(Continued)

(58) Field of Classification Search
CPC ......... B60R 19/24; B60R 19/26; B60R 19/34; B60R 2019/247; B60R 2019/262
(Continued)

(56) References Cited

U.S. PATENT DOCUMENTS 3,795,419 A * 3/1974 Niemkiewicz .......... B60R 19/26
                                                       293/136
9,211,857 B2   12/2015 So et al.
(Continued)

FOREIGN PATENT DOCUMENTS

DE    102004049096 A1   4/2006
EP         1316479 A2   6/2003
(Continued)

OTHER PUBLICATIONS

International Search Report for PCDKR2015/010917 dated Jan. 18, 2016 from Korean Intellectual Property Office.
(Continued)

*Primary Examiner* — Gregory A Blankenship
(74) *Attorney, Agent, or Firm* — Paratus Law Group, PLLC (57) ABSTRACT

The present invention relates to a bumper system for a vehicle, and provides a bumper system for a vehicle, the system comprising: a bumper beam which has a fastening hole formed through each end thereof in the forward and backward direction; a crash box which is inserted into the fastening hole of the bumper beam; and a bracket which is fastened to the bumper beam so as to be able to prevent the crash box from being separated. Thereby, the system can meet both low speed crash regulations and RCAR performance.

3 Claims, 9 Drawing Sheets

(51) Int. Cl.
- *B60R 19/34* (2006.01)
- *B60R 19/18* (2006.01)
- *F16F 7/12* (2006.01)
- *B60R 19/04* (2006.01)
- *B60R 21/00* (2006.01)
- *B60R 19/00* (2006.01)

(52) U.S. Cl.
CPC ............... *B60R 19/34* (2013.01); *F16F 7/12* (2013.01); *B60R 19/00* (2013.01); *B60R 21/00* (2013.01); *B60R 2019/1853* (2013.01); *B60R 2019/262* (2013.01)

(58) Field of Classification Search
USPC ......................................... 293/132, 133, 155
See application file for complete search history.

(56) References Cited

U.S. PATENT DOCUMENTS

| | | | |
|---|---|---|---|
| 9,598,033 B1* | 3/2017 | Berger | B60R 19/03 |
| 2003/0141729 A1 | 7/2003 | Burkhardt et al. | |
| 2004/0169383 A1* | 9/2004 | Shimotsu | B60R 19/34 |
| | | | 293/133 |
| 2004/0262931 A1* | 12/2004 | Roussel | B60R 19/18 |
| | | | 293/120 |
| 2011/0285152 A1 | 11/2011 | Kwon et al. | |
| 2012/0025546 A1* | 2/2012 | Haneda | B21D 39/032 |
| | | | 293/132 |
| 2012/0262931 A1* | 10/2012 | Namiki | C09J 9/02 |
| | | | 362/382 |
| 2012/0267908 A1* | 10/2012 | Kokubo | B60R 19/34 |
| | | | 293/133 |
| 2013/0001963 A1* | 1/2013 | Haneda | B60R 19/34 |
| | | | 293/133 |
| 2014/0008924 A1* | 1/2014 | Han | B60R 19/18 |
| | | | 293/133 |
| 2014/0292007 A1* | 10/2014 | Kawamata | B60R 19/34 |
| | | | 293/133 |
| 2014/0353990 A1* | 12/2014 | Ishitobi | B60R 19/34 |
| | | | 293/133 |
| 2016/0059809 A1* | 3/2016 | Midoun | B60R 19/34 |
| | | | 293/133 |
| 2017/0088075 A1* | 3/2017 | Hashimoto | F16F 7/12 |
| 2017/0166148 A1* | 6/2017 | Freundl | B60R 19/18 |
| 2017/0327065 A1* | 11/2017 | So | B60R 19/18 |

FOREIGN PATENT DOCUMENTS

| | | |
|---|---|---|
| JP | S62-203849 A | 9/1987 |
| JP | 2011-057112 A | 3/2011 |
| JP | 2012-153254 A | 8/2012 |
| KR | 10-0765844 B1 | 10/2007 |
| KR | 10-0775806 B1 | 11/2007 |
| KR | 10-2010-0104457 A | 9/2010 |
| KR | 10-2013-0056472 A | 5/2013 |
| KR | 10-1327016 B1 | 11/2013 |
| KR | 10-1358294 B1 | 2/2014 |
| KR | 10-1375497 B1 | 3/2014 |
| WO | WO 02/22403 A1 | 3/2002 |

OTHER PUBLICATIONS

European Search Report for related EP application No. 15863402.2 dated May 4, 2018 from European Patent Office.

* cited by examiner

BUMPER BEAM(for coping with speed crash)

CRASHBOX(for coping with RCAR)

(b)

STAY(for coping with IISH)

BUMPER BEAM(for coping with low speed crash)

(c)

CRASHBOX(for coping with RCAR)

BUMPER BEAM(for coping with low speed crash)

FD-CURVE ANALYSIS RESULT

FD-CURVE ANALYSIS RESULT

BUMPER SYSTEM FOR VEHICLE

CROSS REFERENCE TO PRIOR APPLICATIONS

This application is a National Stage Patent Application of PCT International Patent Application No. PCT/KR2015/010917 (filed on Oct. 15, 2015) under 35 U.S.C. § 371, which claims priority to Korean Patent Application No. 10-2014-0166094 (filed on Nov. 26, 2014), which are all hereby incorporated by reference in their entirety.

TECHNICAL FIELD

The present invention relates to a bumper system for a vehicle, and more particularly, to a bumper system for a vehicle, which satisfies both low speed crash regulation performance and property insurance company requirement performance, which are different from each other by regional groups.

BACKGROUND ART

In general, bumper systems for a vehicle are required to satisfy low speed crash tests and property insurance regulatory agency (RCAR, IIHS) tests, which are regulations. In this case, the required performance of the property insurance companies, which have a great influence on automobile sales, is more demanding than the regulations. For example, in the RCAR test, after two tests, i.e., a 40% and 10 degree offset barrier test and a bumper dummy barrier test are performed, the repair costs are calculated with respect to the damage of the vehicle body, and performance of one or both of the two tests is requested regionally.

Thus, a bumper beam and a crash box, which constitute the bumper system for the vehicle, should have a structure in which crash energy is maximally absorbed by compression/deformation/destruction in the 40% and 10 degree offset barrier test of the RCAR test, which is required by the property insurance companies. Since the performance required by the property insurance companies is high, most manufactures have applied high-strength composite plastic materials and high-strength steel materials to the bumper system. However, when the materials are applied, the costs increase in proportion to the increase in strength. Also, since the regulatory performance required in each area and the performance required by the property insurance companies are different from each other, the bumper system to be developed has to increase in specification.

Figure 1:
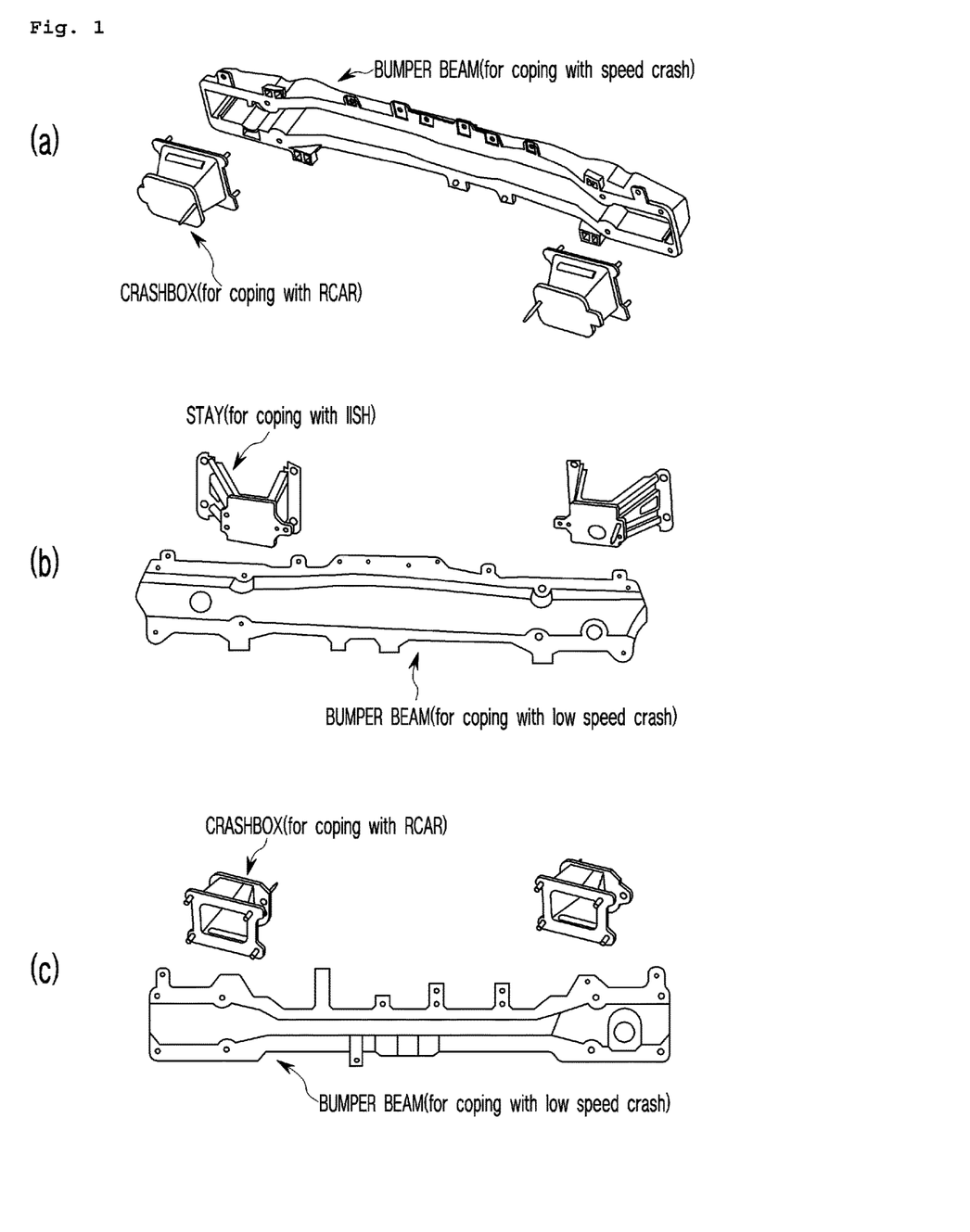
FIG. 1 is an exploded perspective view of a bumper system for a vehicle according to a related art.

For example, as illustrated in FIG. 1, the European bumper system (see FIG. 1A), the North America bumper system (see FIG. 1B), and the domestic bumper system (see FIG. 1C) are different in specification of the bumper beam and the crash box according to sales areas.

Thus, a crash box for a vehicle, which is capable of absorbing energy while the crash box is sequentially crashed down on an shock, is disclosed in Korean Patent Registration No. 10-1327016 (hereinafter, referred to as a "prior art 1"). However, the prior art 1 does not specifically disclose a method for fastening the crash box to a vehicle body, although a member is minimized in damage by matching cross sections of the crash box and the member. Thus, according to the prior art 1, there is a problem that accessory parts have to be added for fastening the vehicle body, resulting in making it practically difficult to reduce a weight. Also, the crash box has to be crashed down from an impacted portion, i.e., a front portion in order to prevent the vehicle body from being damaged. In case of the prior art 1, it is difficult to easily induce the abovementioned feature, and also, it is difficult to commercialize the abovementioned feature because it does not take into consideration of an escaping hole of a bolt for towing.

A crash box for a vehicle, in which a steel crash box is optimized in shape in a general bumper beam module system, is disclosed in Korean Patent Registration No. 10-1358294 (hereinafter, referred to as a "prior art 2"). However, in the prior art 2, although a structure in which the crash box is sequentially pressed from a front portion that is a crash site is provided, when considering the bumper barrier test that is added recently, there is a limitation in applying of the prior art 2 as it is. Also, even if applied, it is expected to increase in weight due to an increase in strength of the bumper beam.

DISCLOSURE OF THE INVENTION

Technical Problem

To solve the abovementioned problems of the prior arts, the present invention is to provide a bumper system for a vehicle, which is capable of satisfying required crash performance, which is different by regional groups, at a low cost.

Technical Solution

To solve the abovementioned technical objects, the present invention provides a bumper system for a vehicle, the bumper system including: a bumper beam having a coupling hole, which formed to pass therethrough in front and rear directions, in each of both ends thereof; a crash box inserted into the coupling hole of the bumper beam; and a bracket coupled to the bumper beam to prevent the crash box from being separated.

In this case, the bracket may include: a coupling part fixed to a front portion of a rear wall of the bumper beam; a connection part bent from the coupling part and fixed to an upper portion of the rear wall of the bumper beam; and a separation prevention part bent from the connection part and closely attached to a rear portion of the rear wall of the bumper beam to partially overlap a rear end surface of the crash box.

In this case, the crash box may have one shape selected from a cylindrical shape, a cone shape, a polygonal pillar shape, and a polypyramid shape.

In this case, a material of the crash box may include one material selected from steel, aluminum, composite plastic.

Advantageous Effects

According to the present invention, since the crash box that is necessary for the RCAR performance in each area is assemblably and separably coupled to the bumper beam, which is integrated in one body to satisfy the low-speed crash regulation, the investment cost and the vehicle cost according to the requirements for each specification may be significantly reduced.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present disclosure will be omitted for clarity, and also like reference numerals in the drawings denote like elements.

Figure 2:
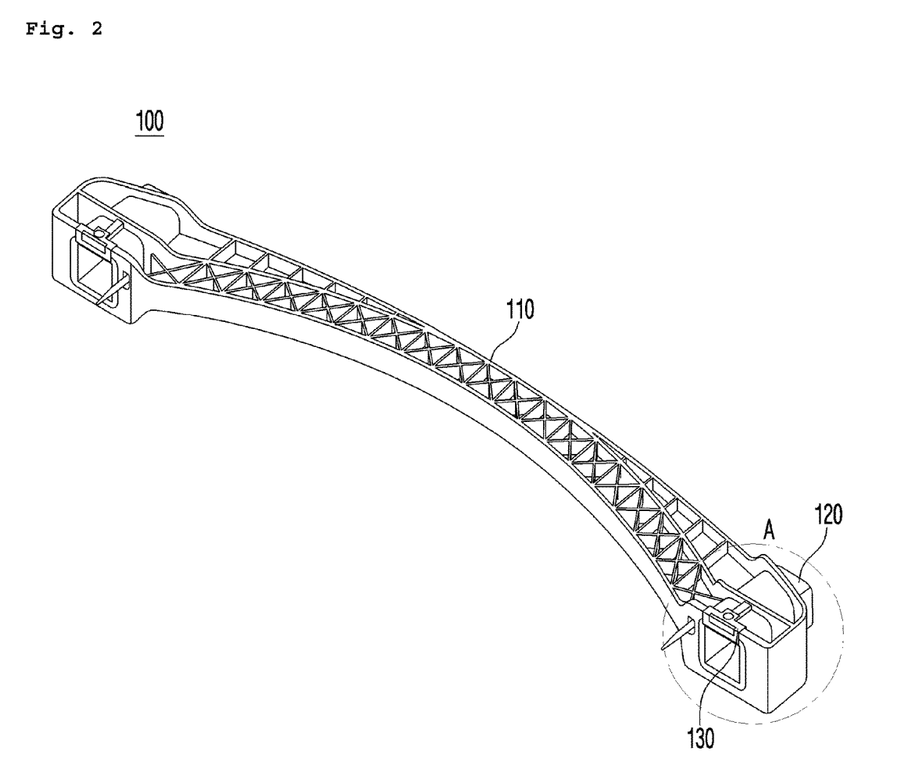
FIG. 2 is a perspective view of a bumper system for a vehicle according to a preferred embodiment of the present invention.
Figure 3:
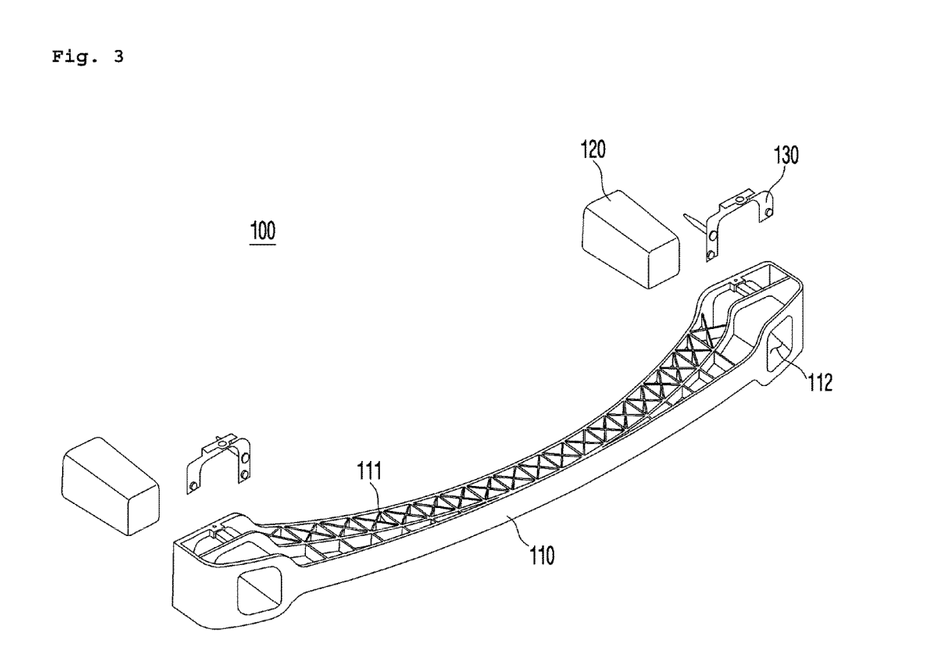
FIG. 3 is an exploded perspective view of the bumper system for the vehicle of FIG. 2.
Figure 4:
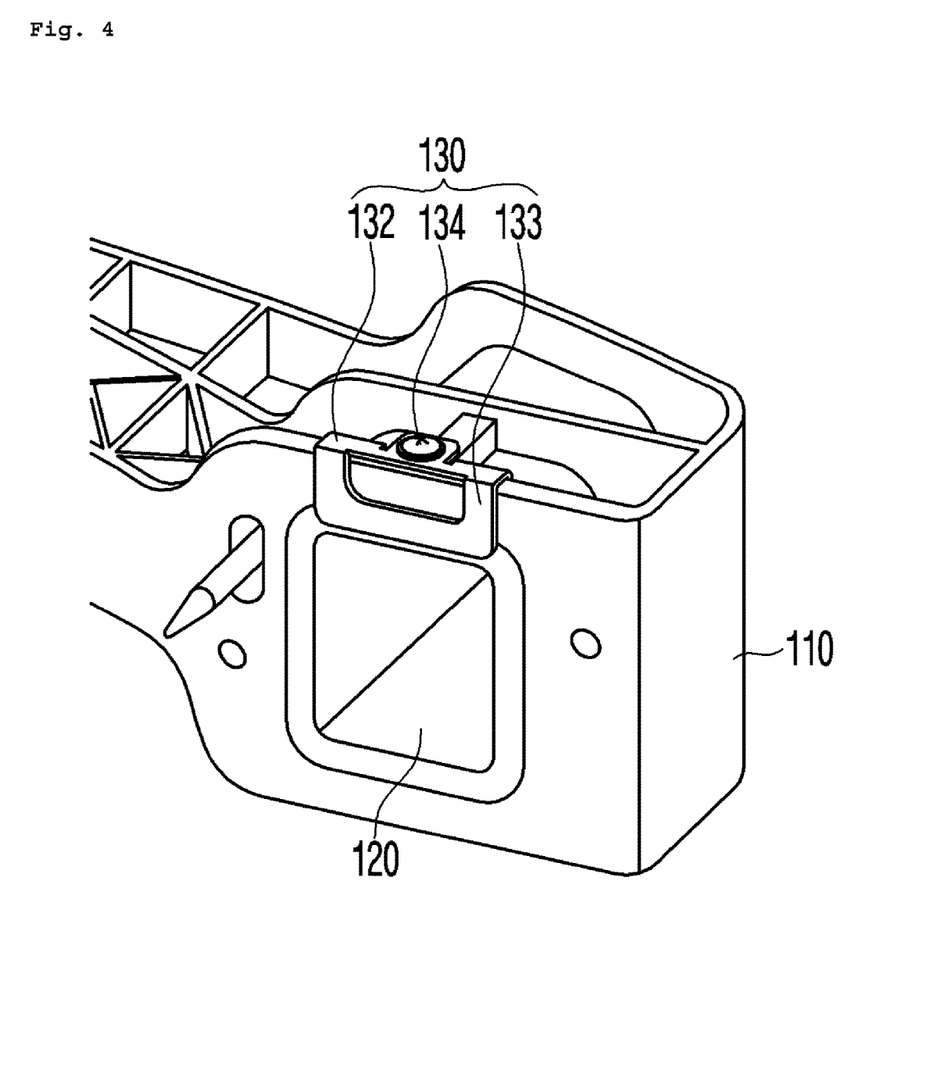
FIG. 4 is a partial enlarged view illustrating a portion A of the bumper system for the vehicle of FIG. 2.
Figure 5:
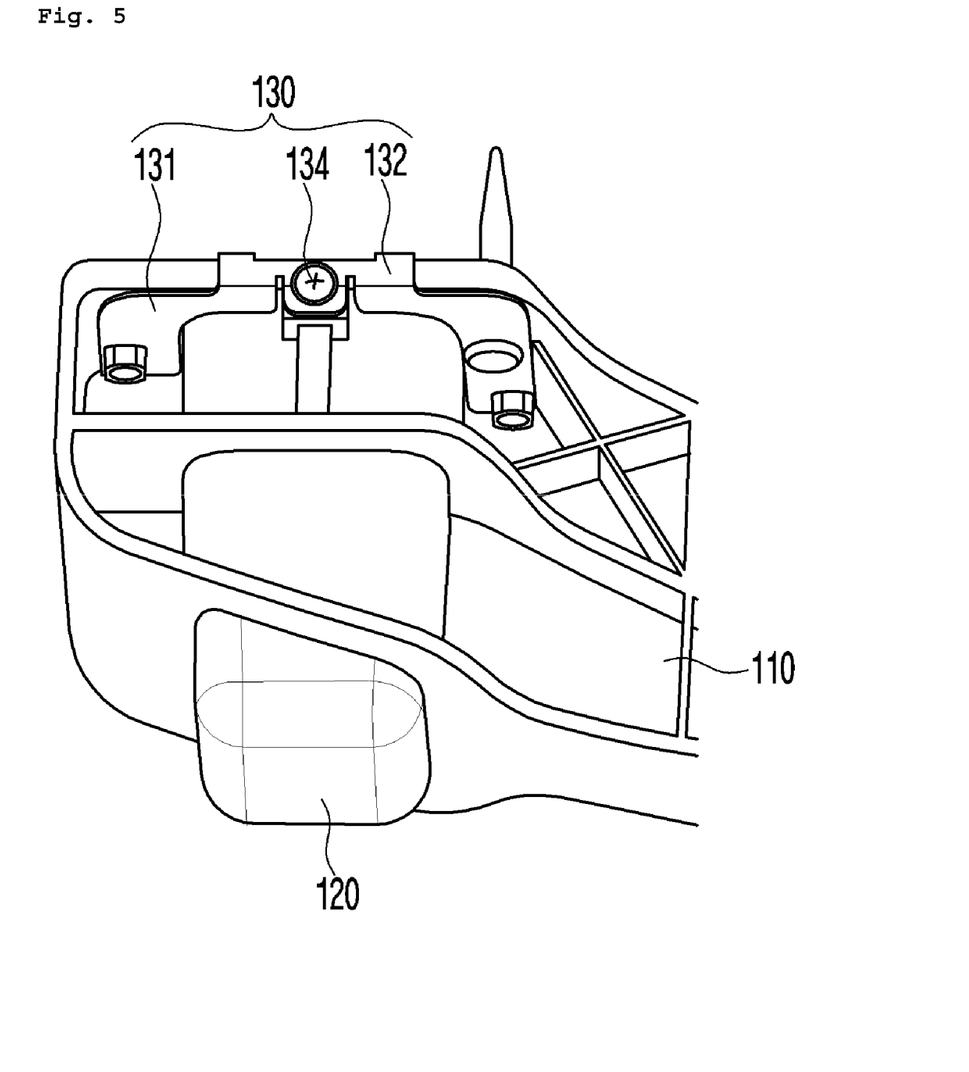
FIG. 5 is a rear perspective view of the enlarged view of FIG. 4.

FIG. 2 is a perspective view of a bumper system for a vehicle according to a preferred embodiment of the present invention, FIG. 3 is an exploded perspective view of the bumper system for the vehicle of FIG. 2, FIG. 4 is a partial enlarged view illustrating a portion A of the bumper system for the vehicle of FIG. 2, and FIG. 5 is a rear perspective view of the enlarged view of FIG. 4.

Referring to FIGS. 2 to 5, a bumper system 100 for a vehicle according to a preferred embodiment of the present invention includes a bumper beam 110, a crash box 120, and a bracket 130.

The bumper beam 110 may be injection-molded in a predetermined shape so as to cope with regulatory requirements, i.e., low speed crash performance of the bumper system 100 for the vehicle to reduce manufacturing costs.

In this case, a plurality of partition walls 111 may be formed in the bumper bean 110 to improve shock absorption. However, the present invention is not limited to the internal structure of the bumper beam 110. For example, it should be understood that the bumper beam 110 may have various internal structures.

However, according to the present invention, the bumper beam, which is required to be developed for each area, may be integrated as one shape, and the crash boxes having various shapes and structures may be detachably disposed to the bumper beam to satisfy the requirement performance of the property insurance company. Thus, it is preferable that the internal structure of the bumper beam 110 is unified into the form that capable of satisfying all low speed crash performance for each area.

A coupling hole 112 is formed in each of both ends of the bumper beam 110. The coupling hole 112 is configured to couple the crash box 120 and passes through each of both the ends of the bumper beam 110 in front and rear directions. In this case, the coupling hole 112 may vary in shape according to an outer appearance of the crash box 120.

The crash box 120 may be configured to cope with the property insurance company requirement performance of the bumper system 100 for the vehicle, i.e., the RCAR performance. Thus, the present invention has a technical feature in which the crash box 120 is assembably and separably coupled to the bumper beam 110.

Particularly, the crash box 120 may be inserted into and separated from the coupling hole 112 of the bumper beam 110 to facilitate the assembly and separation.

As described above, the crash box 120 may have one shape selected from a cylindrical shape, a cone shape, a polygonal pillar shape, and a polypyramid shape according to the performance required by the property insurance company in each area. That is, the crash box 120 may be modified into a shape that is capable of satisfying the RCAR performance that is the requirement performance of the property insurance company, which is different for each area.

When the crash box 120 is configured as described above, in case where only the crash box is provided in the replaceable form to the bumper beam, which is integrated in one body, since it copes with the specifications of each local bumper system, it may satisfy the RCAT performance as well as the low speed crash performance, and thus, the investment costs and vehicle costs due to a difference in product specification may be significantly reduced.

Also, all of aluminum or plastic composites as well as steel may be applied as a material for the crash box 120 so as to reduce the weight.

The bracket 130 may prevent the crash box 120 from being separated from the bumper beam 110 and be coupled to the bumper beam 110.

Particularly, as illustrated in FIGS. 4 and 5, the bracket 130 include a coupling part 131 fixed to a front portion of the rear wall of the bumper beam 110, a connection part 132 bent from the coupling part 131 and fixed to an upper portion of the rear wall of the bumper beam 110, and a separation prevention part 133 bent from the connection part 132 and closely attached to a rear portion of the rear wall of the bumper beam 110. As a result, the bracket 130 may have a ⊏-shaped cross-sectional structure on the whole.

In this case, the coupling part 131 and the connection part 132 may be fixed to each other by using a bolt 134. The separation prevention part 133 may partially overlap a rear end surface of the crash box 120 to prevent the crash box 120 from being separated backward by an impact applied from a front side of the vehicle body.

As described above, the bumper system for the vehicle according to the preferred embodiment of the present invention was illustrated.

The inventors performed a structural analysis with respect to a RCAR 40% offset test of the bumper system according to the related art and the bumper system according to the present invention. The results obtained through the structural analysis were illustrated in FIGS. 6 to 9.

Figure 6:
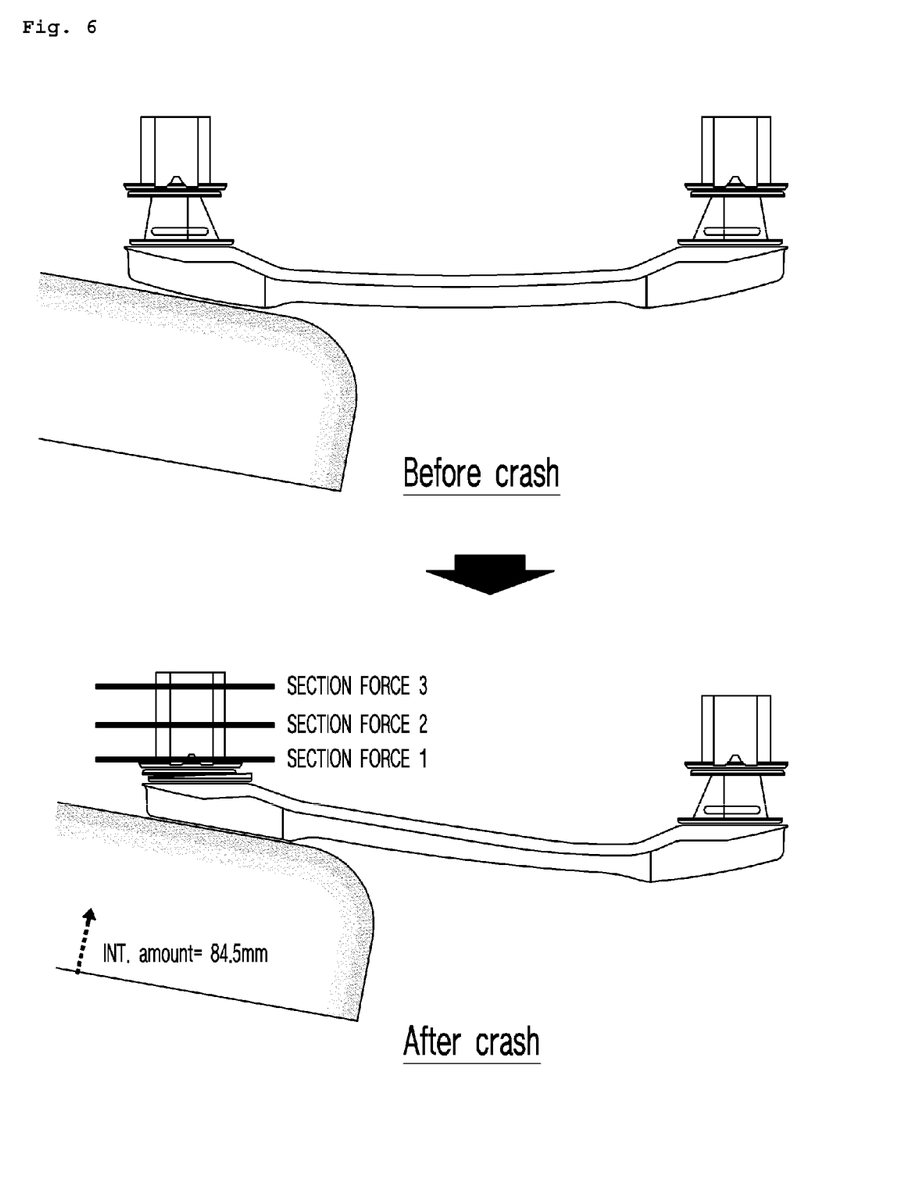
FIGS. 6 and 7 are views illustrating structural analysis results with respect to a crash test of the bumper system according to the related art.
Figure 7:
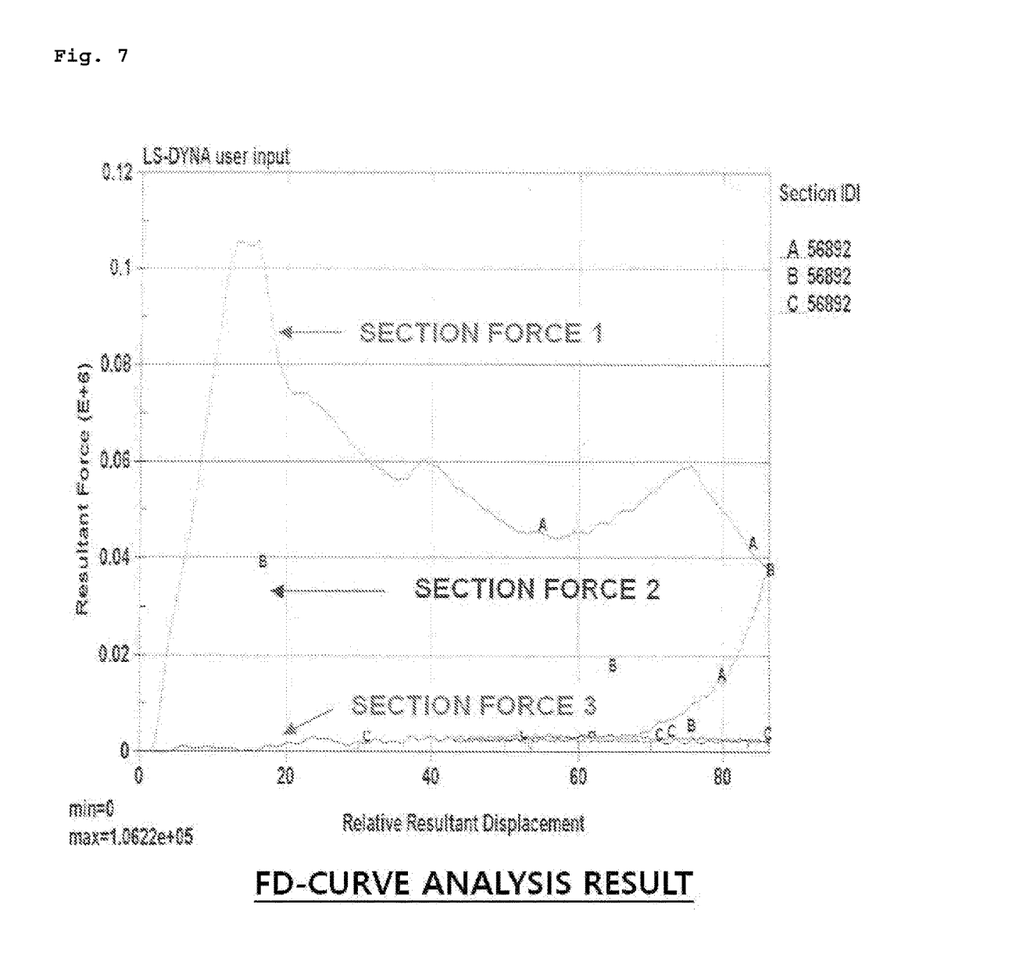
Figure 8:
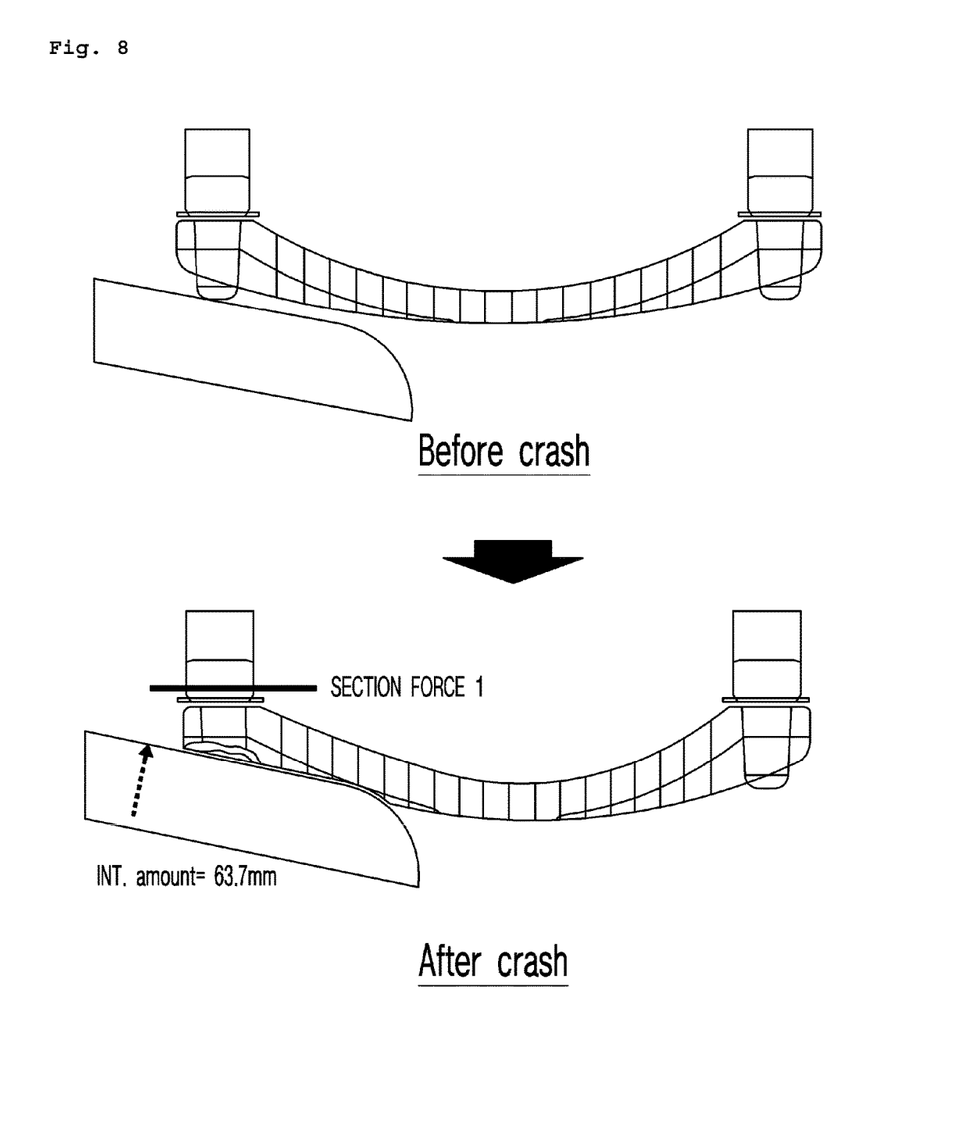
FIGS. 8 and 9 are views illustrating structural analysis results with respect to a crash test of the bumper system according to the present invention.
Figure 9:
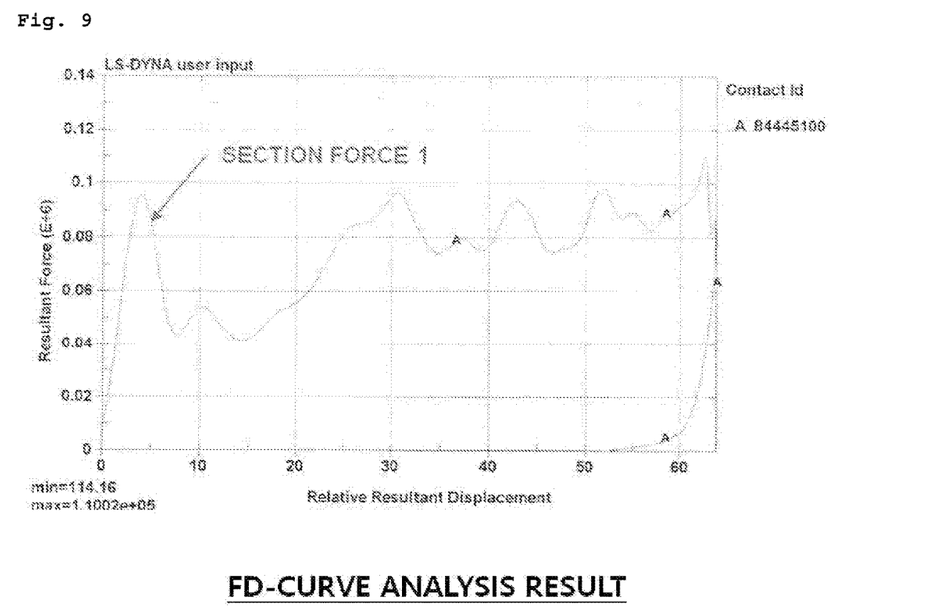

Particularly, FIGS. 6 and 7 are views illustrating intrusion and crash energy absorption of the bumper system according to the related art, and FIGS. 8 and 9 are views illustrating intrusion and crash energy absorption of the bumper system according to the present invention.

Referring to FIGS. 6 to 9, it is seen that the crash energy absorption of the bumper system according to the present invention is relatively improved rather than that of the bumper system according to the related art, and the intrusion of the bumper system according to the present invention is relatively reduced rather than that f the pumper system according to the related art, and thereby to satisfy the required crash performance.

The preferred embodiment of the present invention was described above in detail with reference to the accompanying drawings. The description of the present invention is intended to be illustrative, and those with ordinary skill in the technical field of the present invention pertains will be understood that the present invention can be carried out in other specific forms without changing the technical idea or essential features.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A bumper system for a vehicle, comprising:
a bumper beam having a coupling hole, which formed to pass therethrough in front and rear directions, in each of both ends thereof;
a crash box inserted into the coupling hole of the bumper beam; and
a bracket coupled to the bumper beam to prevent the crash box from being separated,
wherein the bracket comprises:
a coupling part fixed to a front portion of a rear wall of the bumper beam;
a connection part bent from the coupling part and fixed to an upper portion of the rear wall of the bumper beam; and
a separation prevention part bent from the connection part and closely attached to a rear portion of the rear wall of the bumper beam to partially overlap a rear end surface of the crash box.

2. The bumper system of claim 1, wherein the crash box has one shape selected from a cylindrical shape, a cone shape, a polygonal pillar shape, and a polypyramid shape.

3. The bumper system of claim 1, wherein a material of the crash box comprises one material selected from steel, aluminum, composite plastic.

* * * * *